Figure 1:
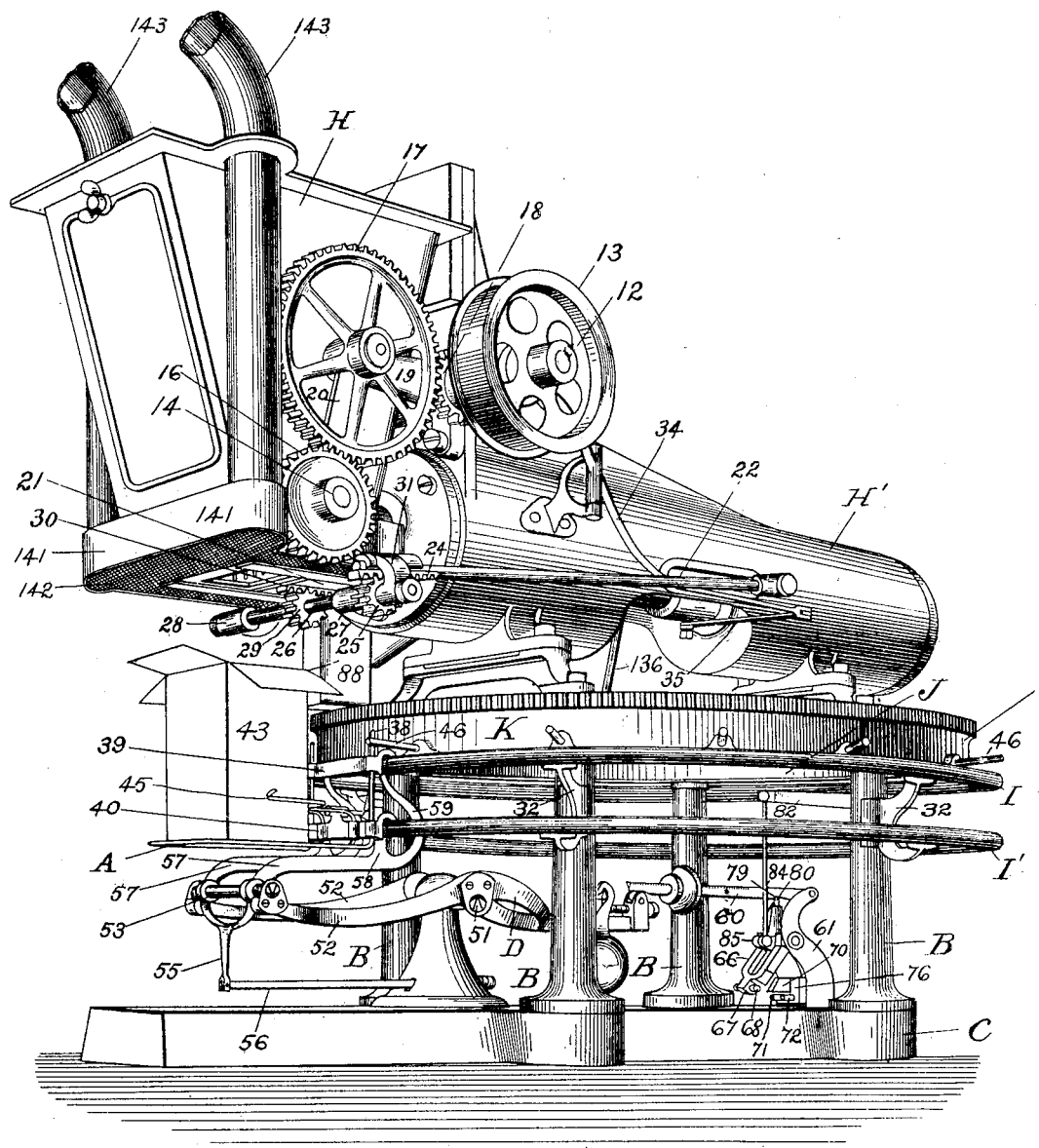

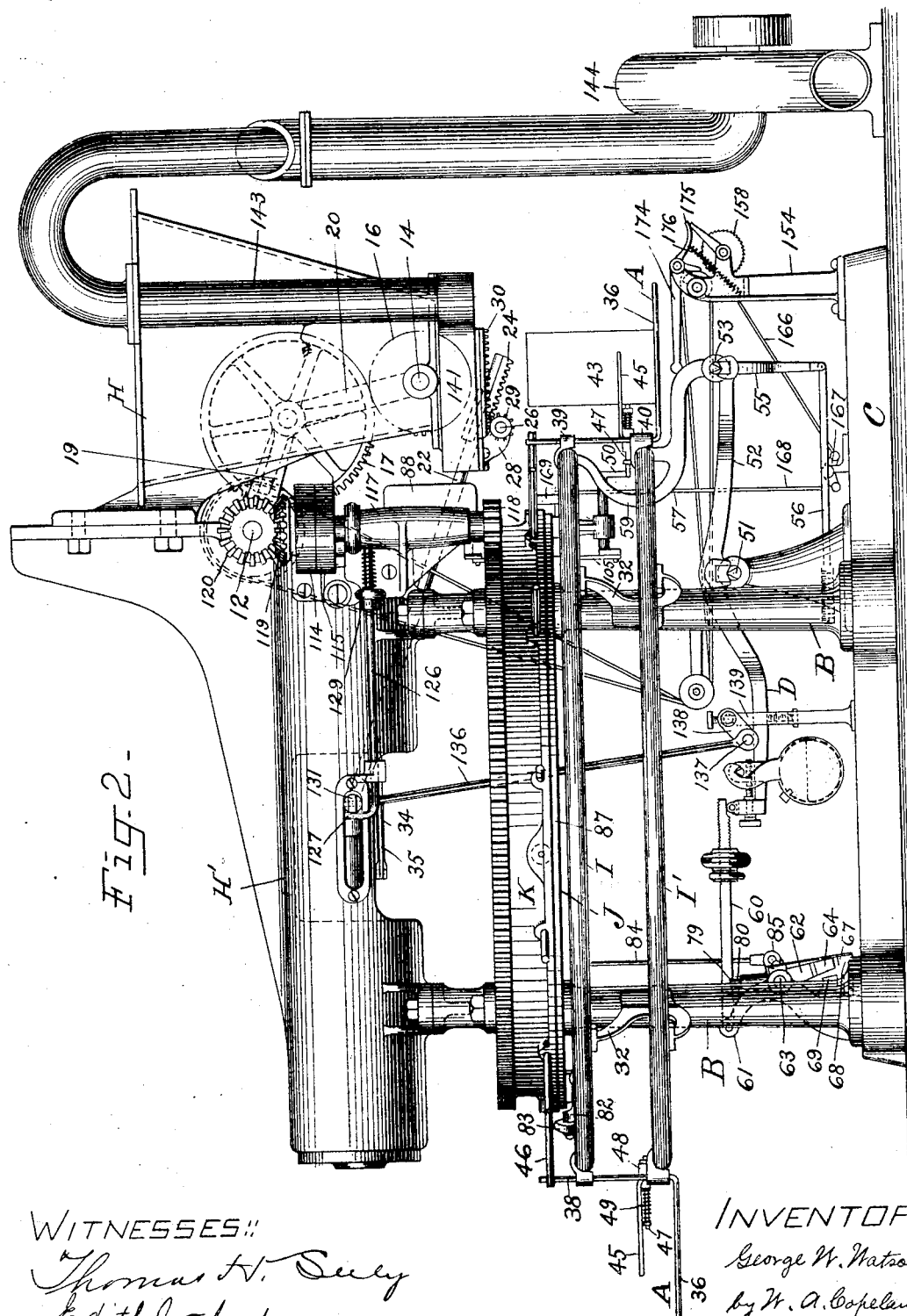

No. 633,253. Patented Sept. 19, 1899.
G. W. WATSON.
WEIGHING AND PACKAGE FILLING MACHINE.
(Application filed June 30, 1897.)
(No Model.) 10 Sheets—Sheet 3.
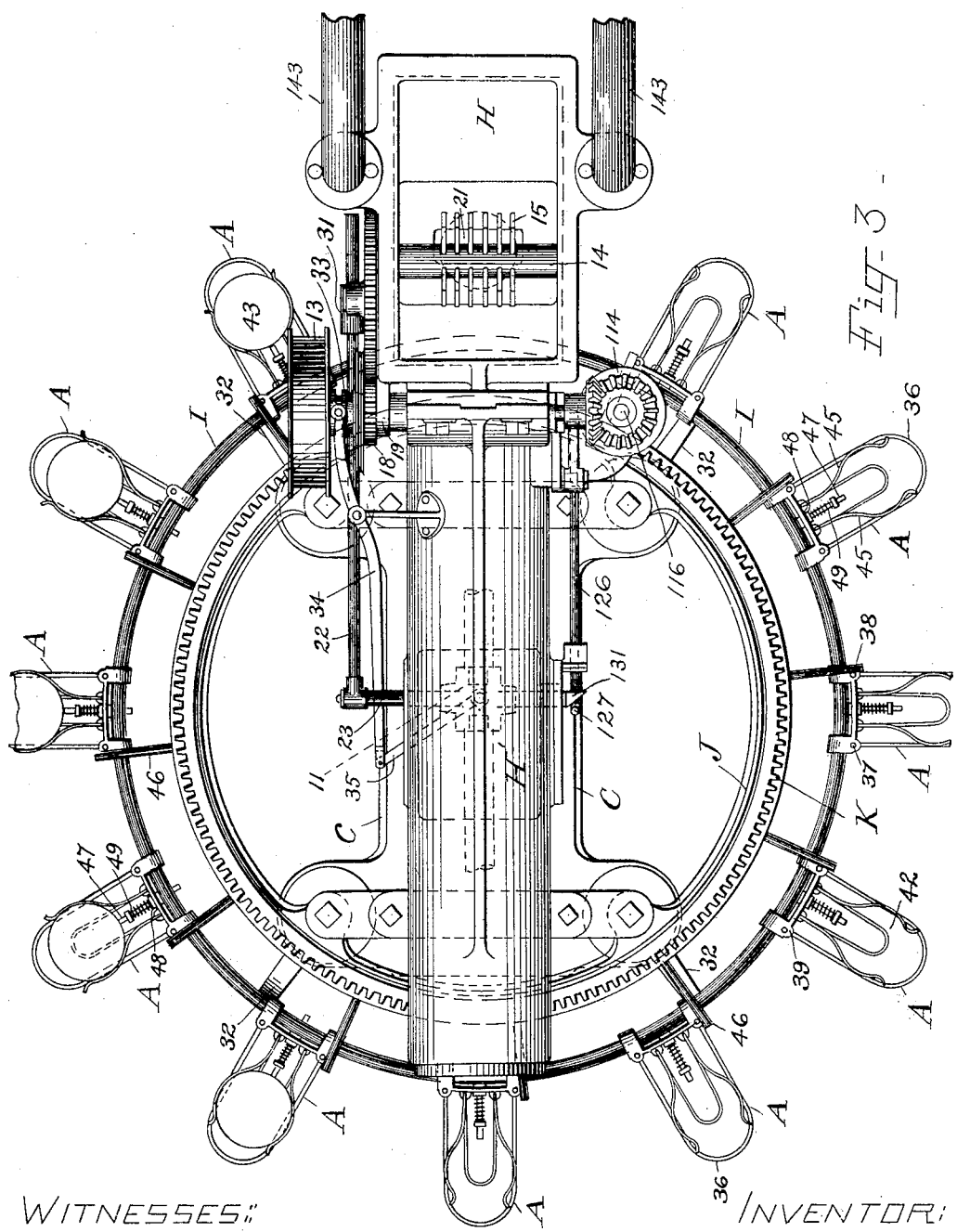
WITNESSES:
Thomas H. Seely
Edith J. Anderson.
INVENTOR:
George W. Watson.
by W. A. Copeland
his atty.

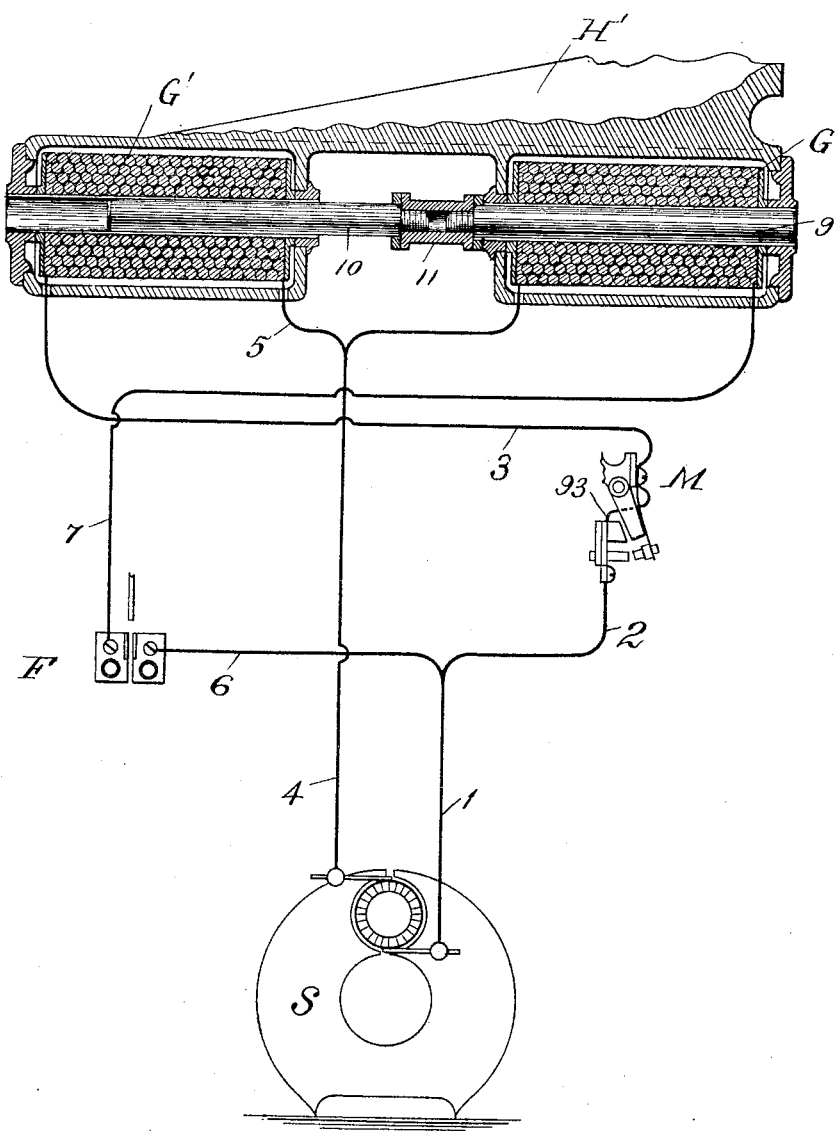

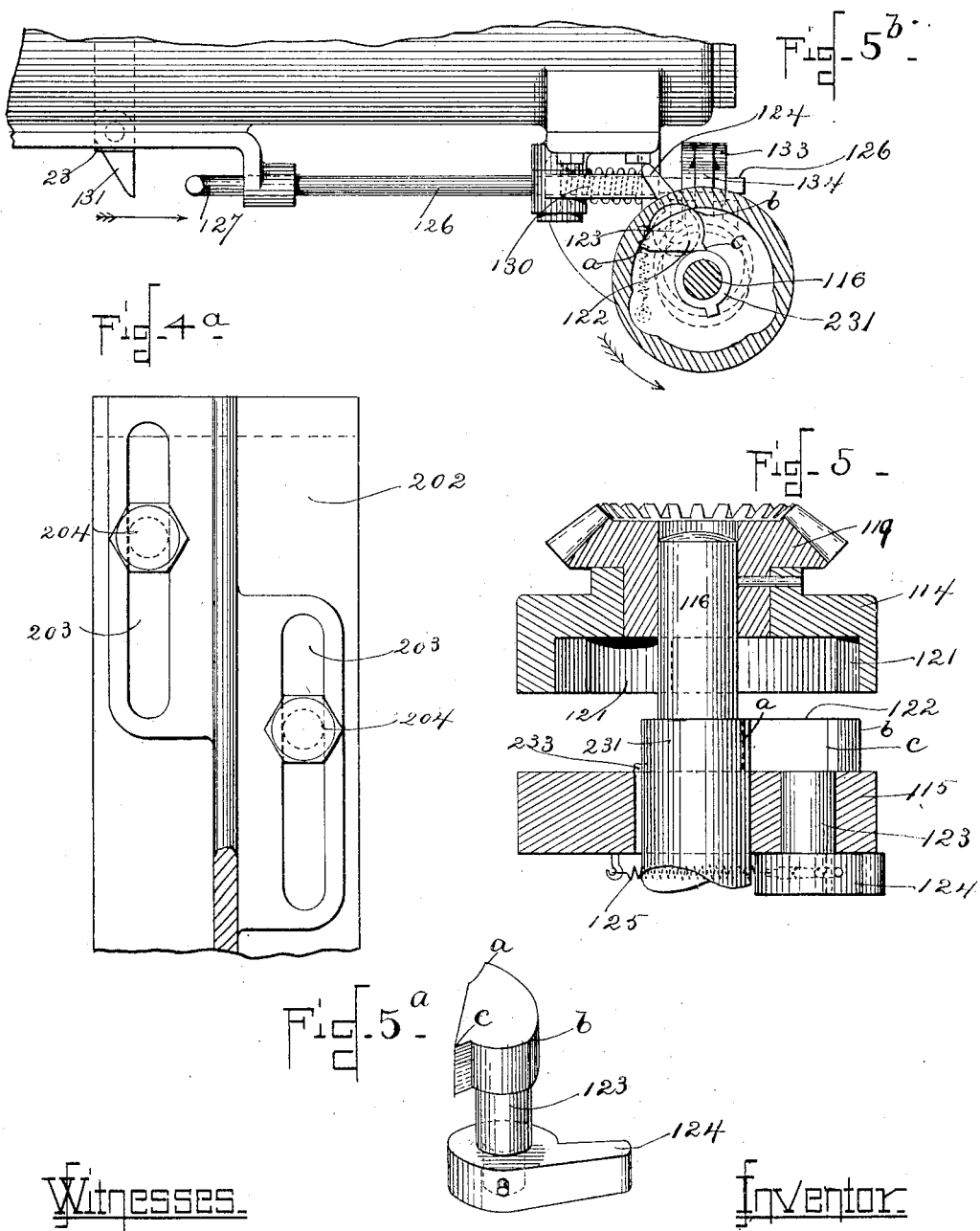

No. 633,253. Patented Sept. 19, 1899.
G. W. WATSON.
WEIGHING AND PACKAGE FILLING MACHINE.
(Application filed June 30, 1897.)
(No Model.) 10 Sheets—Sheet 6.
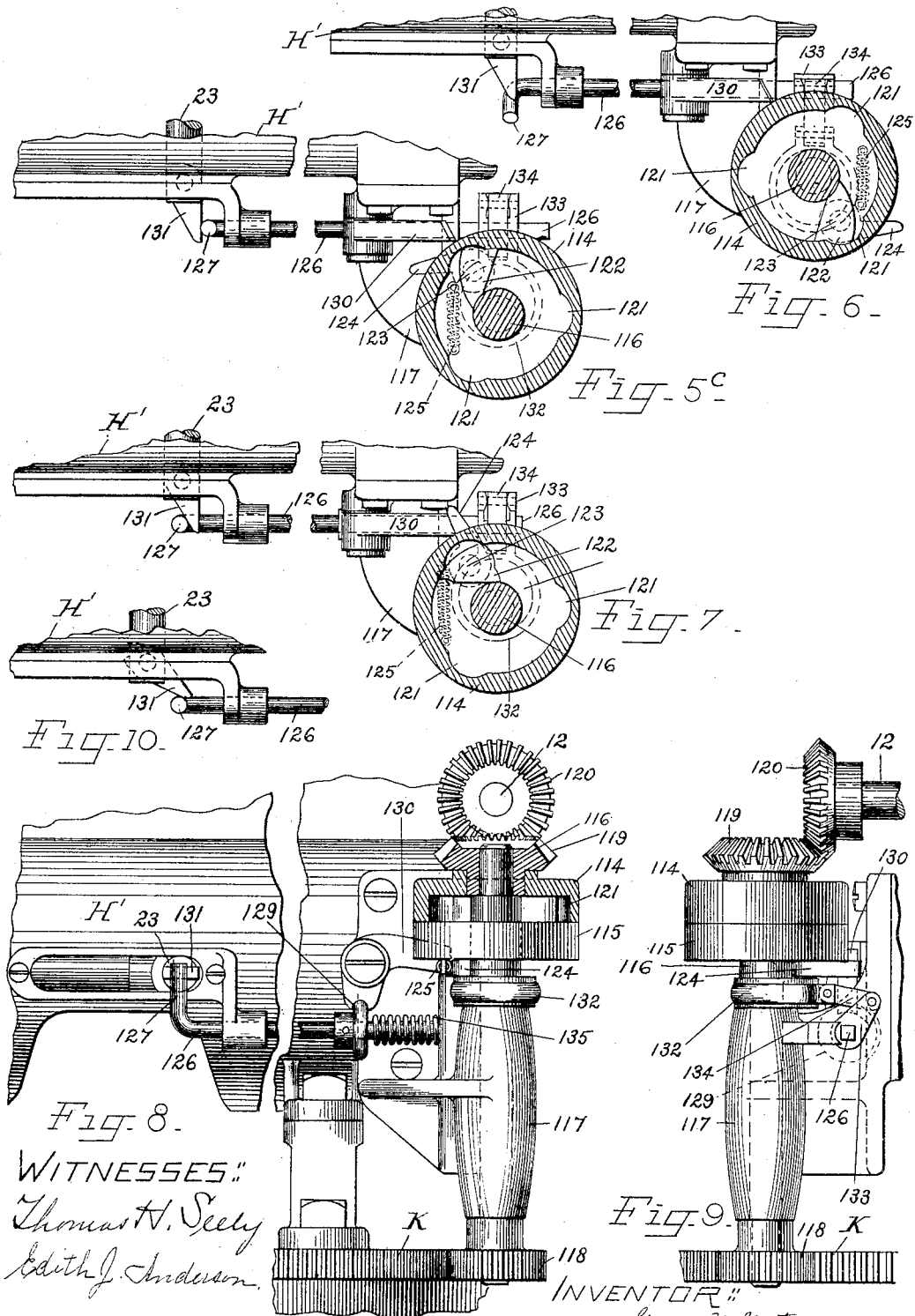
WITNESSES:
Thomas H. Seely
Edith J. Anderson
INVENTOR:
George W. Watson
by W. A. Copeland
his atty.

No. 633,253. Patented Sept. 19, 1899.
G. W. WATSON.
WEIGHING AND PACKAGE FILLING MACHINE.
(Application filed June 30, 1897.)
(No Model.) 10 Sheets—Sheet 7.
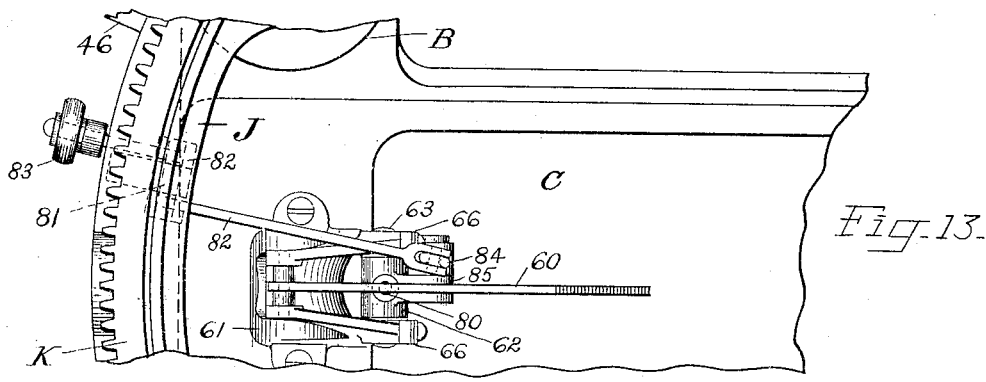
Fig. 13.
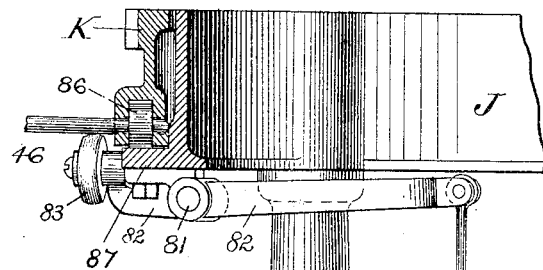
Fig. 11.
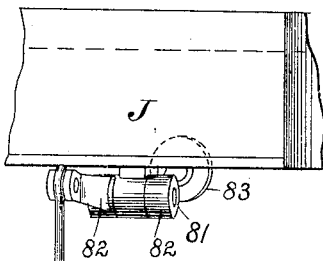
Fig. 12.
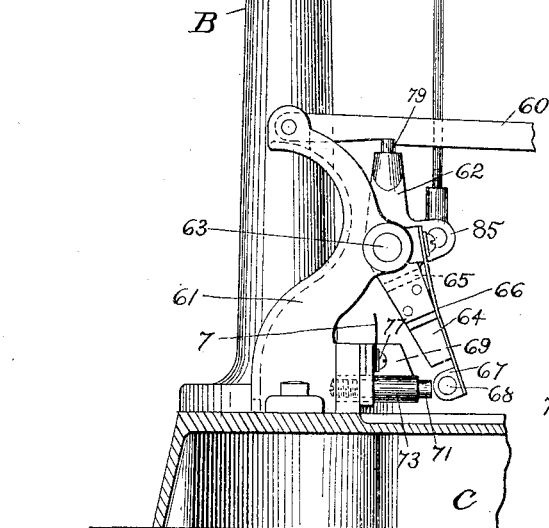
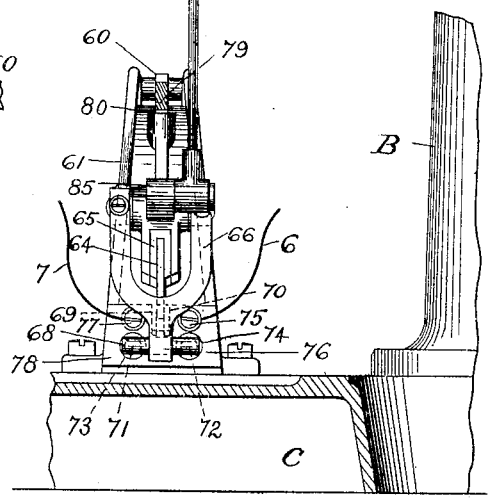
WITNESSES:
Thomas H. Seely
Edith J. Anderson
INVENTOR:
George W. Watson
by W. A. Copeland
his atty.
THE NORRIS PETERS CO., PHOTO-LITHO., WASHINGTON, D. C.

No. 633,253. Patented Sept. 19, 1899.
G. W. WATSON.
WEIGHING AND PACKAGE FILLING MACHINE.
(Application filed June 30, 1897.)
(No Model.) 10 Sheets—Sheet 8.
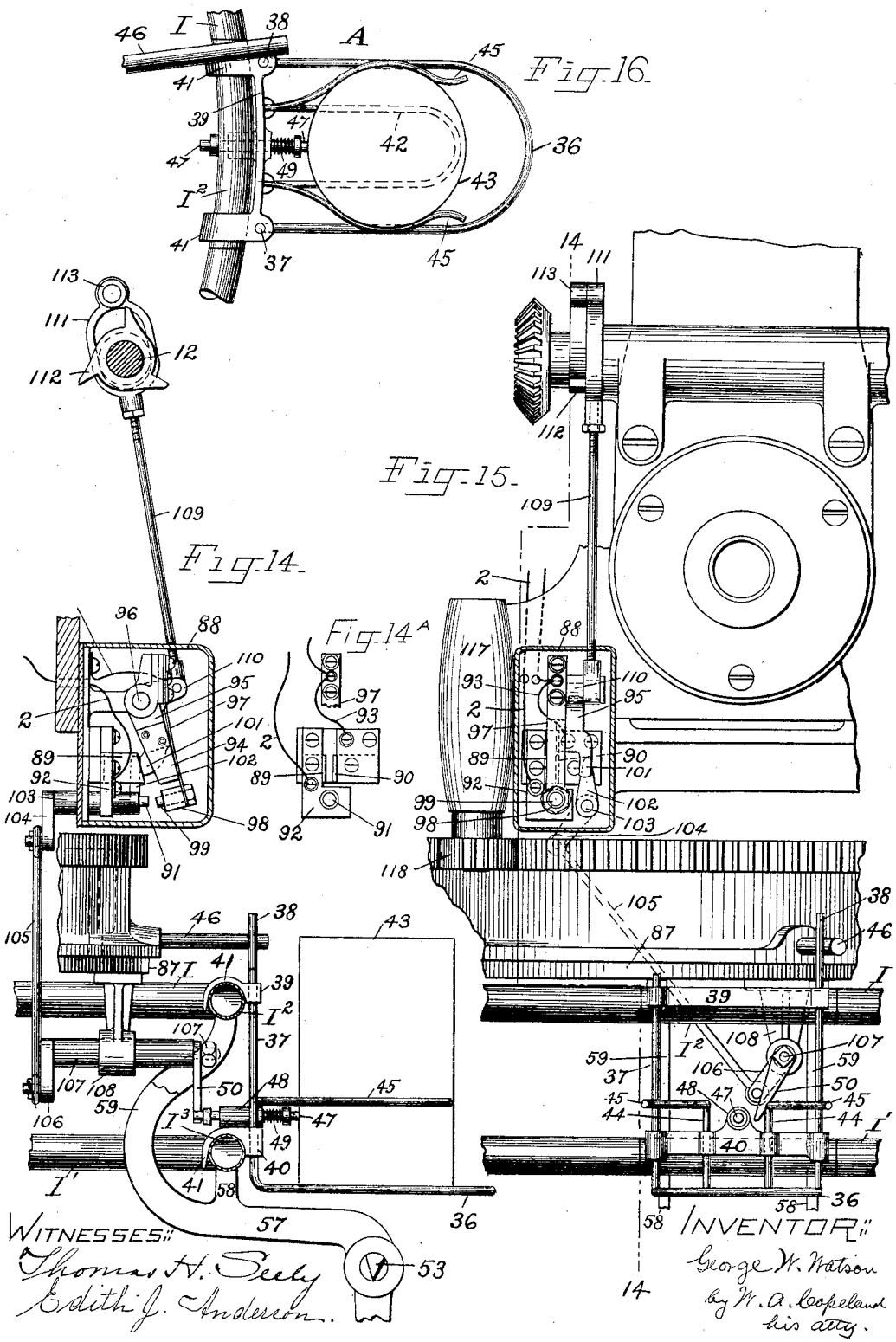

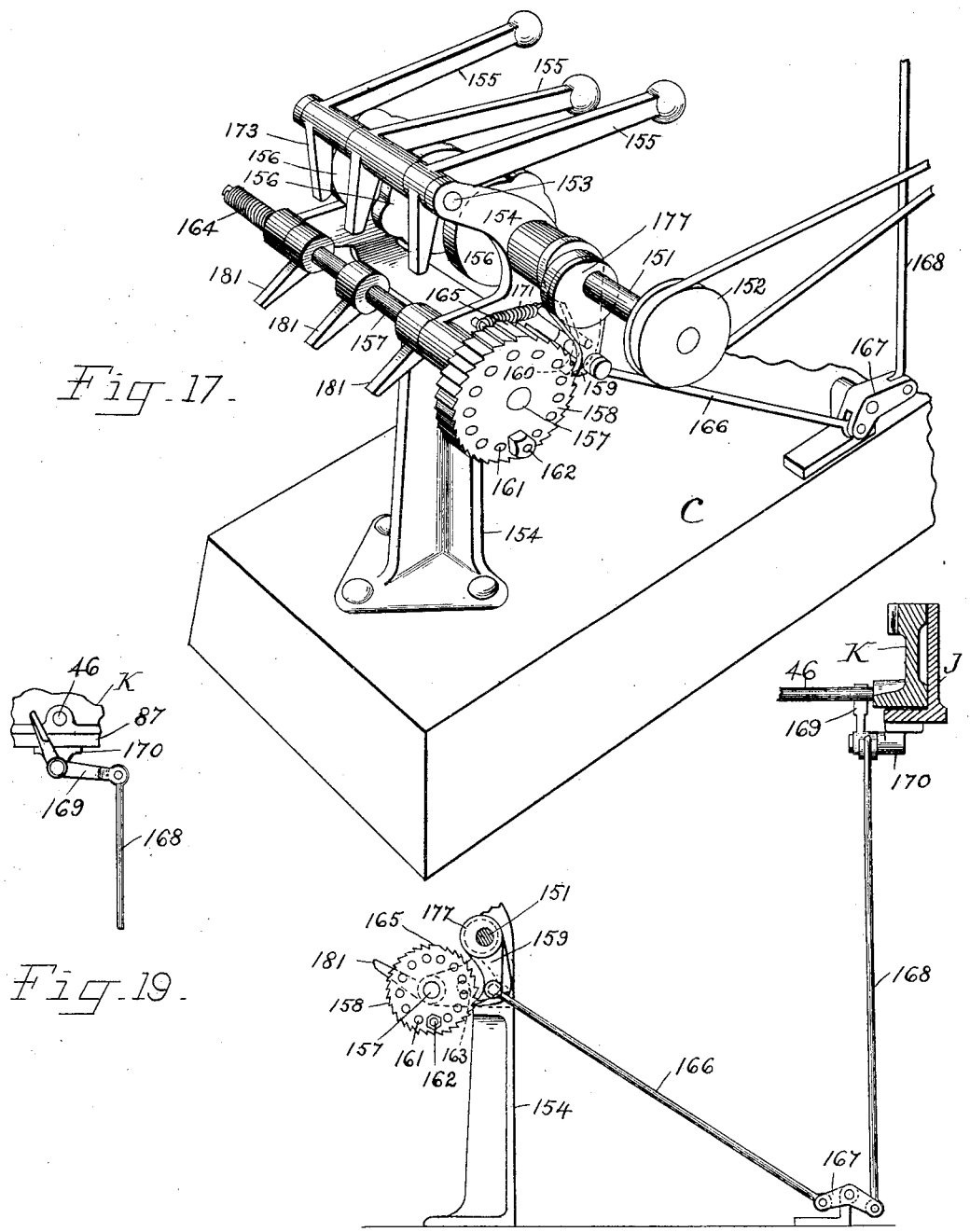

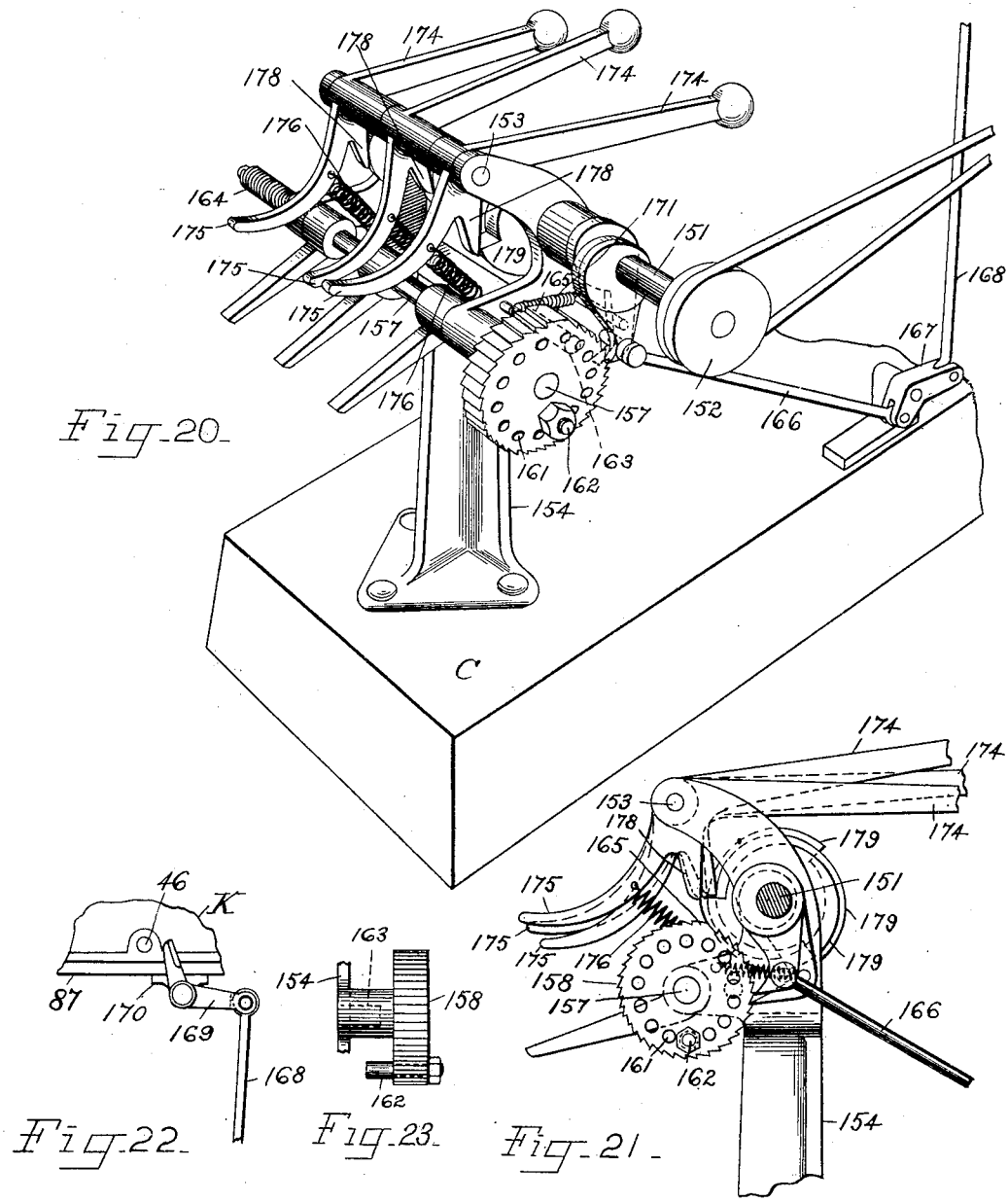

UNITED STATES PATENT OFFICE.

GEORGE W. WATSON, OF BOSTON, MASSACHUSETTS, ASSIGNOR TO THE ELECTRIC SCALE COMPANY, OF KITTERY, MAINE.

WEIGHING AND PACKAGE-FILLING MACHINE.

SPECIFICATION forming part of Letters Patent No. 633,253, dated September 19, 1899.

Application filed June 30, 1897. Serial No. 642,923. (No model.)

*To all whom it may concern:*

Be it known that I, GEORGE W. WATSON, a citizen of the United States, residing at Boston, in the county of Suffolk, Commonwealth of Massachusetts, have invented certain new and useful Improvements in Weighing and Package-Filling Machines, of which the following is a specification, reference being had to the accompanying drawings, which form a part hereof.

My invention is an improvement on the machine shown in the patent to W. H. Doble and myself, dated March 10, 1896, No. 556,258.

One feature of my invention consists in the novel contact mechanism for the forward and rear contacts.

Another feature consists in the novel package-carrier and the mechanism for moving the same.

Another feature consists in a locking device for locking the scale-beam after a package has been weighed and until it has been removed.

Another feature consists in an exhaust attachment to conduct away the dust and fine particles which arise during the filling operation.

Another feature consists in a tapper which taps the package during the filling operation to settle the goods in the package and in certain other features, all of which will be described in the specification and more particularly pointed out and distinctly defined in the claims at the close of this specification.

In the drawings, Figure 1 is a perspective view of a machine embodying my invention with the tapper removed. Fig. 2 is a view of the machine on the opposite side from Fig. 1. Fig. 3 is a plan. Fig. 4 is a diagram of the circuit and a section through the solenoid. Fig. 4ª is an elevation, partly in section and broken away, of the rear of the flange-plate on the frame to which the hopper is adjustably bolted. Fig. 5 is a detail vertical section through the shell 114 and base 115 of the clutch which controls the movement of the package-moving ring, the shell being lifted, so as to show the pawl with its toe $a$ against the shaft and the heel $b$ in the position in which it will be when the shell and base are locked together. Fig. 5ª is a detail perspective of the two pawls 122 and 124 and their connecting-pivot 122. Fig. 5ᵇ is a plan, partly in section, through the clutch before the two members of the clutch are locked together. Fig. 5ᶜ is a sectional plan through the clutch, showing the pawl just entered into one of the recesses in the clutch and the clutch about to start. Fig. 6 is a sectional plan of the same clutch after a partial rotation and showing the push-rod falling behind the pawl on the cross-head. Fig. 7 is a sectional plan of the same clutch at the end of a rotation. Fig. 8 is a side view of Fig. 7. Fig. 9 is an end view of Fig. 8. Fig. 10 is a detail view showing the pawl receding from the push-rod as the gate opens. Fig. 11 is a side view of the rear contact and some of the connecting mechanism, the contact being shown open. Fig. 12 is a front view of Fig. 11. Fig. 13 is a plan view of the rear contact, the contact being open. Fig. 14 is a side view, partly in section, through the box inclosing the forward contact, showing the forward contact and the rod which actuates the same and the side of the scales, the scales being partly broken away. Fig. 14ª is a detail front view of the forward contact with the movable blade and spring partly broken away to more clearly show the fixed blades. Fig. 15 is a front view of the front contact with section through the box which incloses the contact and showing also some of the connecting mechanism. Fig. 16 is a plan of one of the baskets for carrying a can or package, represented as being in position for filling under the hopper. Fig. 17 is a perspective view of one form of the tapper. Fig. 18 is a side view of the same, partly broken away and showing the connection between the trip-lever on the ring and the tapper. Fig. 19 is a detail view showing the trip-lever on the bottom of the ring tripped by pins on the moving ring and used to release the tapper and make ready for a new operation. Fig. 20 is a perspective view of a modified form of tapper. Fig. 21 is a detail side view of the modified form of tapper shown in Fig. 20. Fig. 22 is a detail view of the trip-lever for the form of tapper shown in Fig. 20 and similar to the trip-lever shown in Fig. 19, but placed on the opposite side of the pin on the ring. Fig. 23 is a detail showing the adjustment-pin on the ratchet.

G and G' are respectively the forward and rear solenoids, H' the frame, and S (see Fig. 4) a conventional dynamo to electrify the solenoids. The circuit is made from one pole of the dynamo to one pole of the rear or gate-opening solenoid G' through wire 1 and branch 2, forward contact M, and wire 3. The circuit from the opposite pole of the dynamo to the other pole of the rear solenoid is through wire 4 and branch 5. The circuit from one pole of the dynamo to one pole of the forward or gate-closing solenoid G is through wire 1, branch 6, rear contact F, and wire 7. The circuit from the other pole of the dynamo to the other pole of the solenoid G is through wire 4 and branch 8. The two cores 9 10 of the solenoids are connected by a union 11. The main shaft 12 is driven by power through the belt-pulley 13 or in any suitable way.

The hopper H is adjustable vertically, so that it can be raised or lowered to accommodate packages of different heights above the scale. The hopper H has fixed to its front end a flange-plate 201. The frame H' has at its rear an upright plate 202, formed with vertically-elongated slots 203. The hopper H is clamped to the frame-plate 202 by nut-bolts 204, which pass through the slots 203 of plate 202 and screw into flange-plate 201. By loosening the nuts the hopper may be raised or lowered, as desired.

The shaft 14, on which the comb 15 is mounted, moves with the hopper. Power is transmitted from the main driving-shaft 12 to the comb-shaft 14 through pinion 18 on the main shaft, intermediate gear-wheel 17, and comb-shaft gear 16. The intermediate gear 17 is supported on links 19 20, connected with the main shaft and comb-shaft, respectively, so that the gearing will mesh whatever may be the position to which the hopper is adjusted. The clutch 33, here shown as a friction-clutch actuated by the sliding core of the solenoid through the rod 34 and link 35, causes the comb to revolve or stand still, according as the gate is open or closed.

The gate 21, which controls the outlet of the hopper, is reciprocated by means of the side rod 22, pivoted at one end to the cross-head 23, connected with the union 11. The forward end of said rod 22 has thereon a rack 24, which engages with the pinion 25 on shaft 26, mounted in bearings 27 28, fixed to the bottom of the hopper. Said shaft 26 has also a pinion 29, which engages with a rack 30 on the gate 21. The reciprocation of the core of the solenoids actuates the side rod 22, and thereby opens and closes the gates. The side rod 22, being pivoted at its rear end to the cross-head 23, accommodates itself to the several adjusted positions of the hopper. The rack 24 is kept in engagement with pinion 25 by means of a hook-finger 31.

Instead of the stationary flat table of said Patent No. 556,258, on which the packages were placed and along which they were moved by bent fingers projecting from the intermittently-moving ring, I now employ a rod or tube in the shape of a ring on which are hung traveling carriers or baskets A, which hold the packages, and to give greater steadiness to the carriers I prefer to employ two of these rings I I', one above the other, which form a two-rail track on which the baskets travel. I employ a fixed supporting-ring J, as before, but only one moving ring K, which, however, moves intermittently and not constantly, as did gear-ring K in the former machine. This intermittently-moving gear-ring carries the package-moving fingers and takes the place of both the constantly-moving gear-ring and the intermittingly-moving package-moving ring of the former machine, all of which will be more fully described hereinafter. The fixed rings I I' are preferably, for lightness and convenience of form, made of metal tubing and are supported on brackets 32, fixed to the standards B, rising from the base C of the machine. The rings I I' are cut out at the scales, and short sections $I^2 I^3$, which are fixed to and form part of the scales, take the place of the scale-pan. These sections $I^2 I^3$ are preferably composed of tubing, like the rings I I', and just fit into the cut-out portion of said ring, but they tip with the scales.

The carrier or basket A has a horizontal ∪-shaped portion 36, with upright end portions 37 38. One of these uprights 38 is higher than the other, so as to be engaged by the pins 46 on the moving ring K. Secured to these vertical portions are the cross-bars 39 40, having hooks 41, by which the basket is hooked onto the rings I I'. The baskets are thus easily put onto the rails and removed therefrom. The baskets also have a narrow ∪-shaped bottom portion 42, on which the package or can 43 rests, and vertical portions 44, which pass through holes in the lower cross-bar 40 and have forwardly-extending spring-fingers 45, which embrace the can. The cross-bars and hooks are preferably of metal casting, and the other portions of the basket already described are made of wire. A spring-seated pin 47 is carried in a boss 48 on the cross-bar 40, the pin passing loosely through a hole in the boss. When a package is placed in the basket, the package pushes back the pin against the pressure of the spring 49, thrusting the pin back and holding it back, so that it engages with the arm 50 to actuate the mechanism which makes the forward contact, as will be described hereinafter. If the basket comes around without any package, the pin will not project far enough back to engage arm 50, so that no contact will be made unless a package is in place.

The main scale-beam D is fulcrumed on the knife-edges 51. Crosswise of the rear ends of the forked arms 52 52 of the said main scale-beam is the knife-edged pivot 53. Said pivot 53 is fast in the forked arm 55, hinged at its lower end to the link 56. Said pivot 53 connects the two bent arms 57, which have the short upward projections 58 and the longer bent arms 59. The short lower section I³ of the track is mounted on said projections 58, and the short upper section I² is mounted on the arms 59, so as to tip with the scale, said sections I² I³, as already stated, serving in lieu of a scale-pan. The auxiliary scale-beam 60 is pivoted in the standard 61.

In order to prevent sparking in the gate-closing contact mechanism, I have main and supplemental contact-receivers and main and supplemental contact-makers, the two sets of contact devices coöperating, so that one shall break contact in advance of the other. This may be accomplished in various ways; but the mechanism which I have employed in the machine shown in the drawings is described as follows, (see Figs. 11 and 12:) A lever 62 is pivoted at 63 to the standard 61. Fixed in the lower end of said lever 62 is a metal knife 64, of phosphor-bronze or some other suitable conducting material, insulated from the lever 62. The insulation is shown at 65. A flat forked spring 66 is screwed to the standard 61 at the ends of the fork-arms, being insulated from the standard, as shown at 261 and 262. The fork-arms spread sufficiently to avoid contact with the lever 62. The spring 66 may, however, contact with the blade 64, and does in fact when the contact is broken, as will be explained hereinafter. Attached to the flat spring 66 near its outer end is a boss 67, in which is held a carbon stick 68, protruding on both sides of the boss. The socket portion of the contact consists of two blades 69 70, secured to the frame, but insulated therefrom and from each other by insulation 263. These blades 69 70 form a groove recess between them, being spaced sufficiently far apart to admit the knife 64 by a rubbing contact. It is preferable to have the groove flare slightly outward or beveled at the entrance edges. Two carbon-points 71 72 are secured in holders 73 74 and are insulated from each other, and each is insulated from the receiving contact-blade of opposite polarity, but need not be insulated from the blade of the same polarity. Wire 6 of the circuit is secured by a binding-screw 75 to the plate 76 of one of the receiving contact-blades 70, and wire 7 is secured by screw 77 to plate 78 of the other receiving-blade 69. The carbon-points 71 72 are so adjusted with relation to the cross carbon stick 68 that when the scale-beam is tipped and the notch 79 in the auxiliary scale-beam 60 is lifted from engagement with the stud 80 on lever 62 a coil-spring 210 around the pivot 81 will throw the lever 62 and cause blade 64 to wedge between contact-blades 69 and 70 and make the circuit through the forward solenoid, and at the same time or a little in advance the carbon 68 will contact with the carbon-points 71 72, thus making a two fold connection. The adjustment of the carbons is such that when the contact is broken by lifting the lever 62 in the manner to be described hereinafter the contact of the blades will be broken slightly previous to the breaking of the carbon-contact, and the current will pass through the carbons for an instant after the metallic contact is broken, thus preventing sparking across the metallic contact which would otherwise occur and soon destroy the efficiency of the contacts. The carbons can readily be replaced when burned out. Before the lever 62 reaches its full outward position the blade 64 will strike the flat spring 66 and push it outward, lifting the carbon 68 and breaking the carbon-contact.

The movable gear-ring K has set into its lower edge a series of rollers or casters 86, on which the gear-ring moves around on the flange 87 of the fixed ring. Pivoted on the under side of the fixed ring J is a lever 82, which at its outer end carries a roller 83 and at its inner end is pivoted to a rod 84, the lower end of the said rod 84 being pivoted to a boss 85 on the lever 62. The adjustment of rod 84 and lever 82 is such that while the rear contact remains broken, as shown in Fig. 11, the roller 83 will allow the fingers 46 to ride over it. When, however, the said contact is closed, the roller 83 will be elevated so as to lie in the path of the fingers 46, and when one of said fingers strikes the roller 83 it will depress the roller and tip the lever 82, thereby lifting rod 84 and tipping lever 62 on its pivot, thus breaking the contact and pulling the lever 62 back until stud 80 is again engaged by notch 79, which holds the contact open until the scale-beam is tipped. A coil-spring 210 around the pivot of lever 82 throws the lever 82 to operate the contact-lever when the scale-beam tips.

The forward contact mechanism M, which makes the circuit through the rear or gate-opening solenoid, will now be described. (See especially Figs. 14 and 15.) It is preferably inclosed in a box 88 for better protection. The construction differs somewhat from the rear contact mechanism F. There are two fixed blades 89 90, of conducting material, preferably phosphor-bronze or other good conducting metal, insulated from each other by insulation 271. There is only one fixed carbon 91, and that is electrically connected with one of the fixed blades 89, as by setting them both in a brass plate 92, having insulation 274 and 275. The wire 2 leads from one pole to said fixed blade 89. The other fixed blade 90 has no carbon. The movable contact-blade 94 is mounted in a lever 95, pivoted at 96, being insulated from said lever. A flat spring 97, secured on the supporting-pivot 96 and insulated therefrom by insulation 272 and 273, rests on the back of said blade 94. It carries at the end a holder 98, within which is a carbon 99, electrically connected with said spring 97. A wire 93 leads from fixed blade 90 to said flat spring 97, so that fixed blade 90, flat spring 97, and movable carbon 99 are all electrically connected. When the movable blade is tipped, the circuit is made both by said blade contacting with the two fixed blades and also by the contact of the two carbons, the carbons being employed for the purpose of preventing sparking between the blades when the contact is broken. The movable metal blades in both contacts are preferably of copper. They can be entirely dispensed with and the carbons alone used; but better results are obtained by using the metal for the main contact, the carbons being employed to prevent them from sparking, which would soon render the blades useless.

On the under side of lever 95, at one side of the blade 94, is a stop projection 101, which during the time the contact is intended to remain open, as shown in Figs. 14 and 15, rests upon the lever 102 to hold the contact open. Lever 102 has a shaft 103, which has a crank-arm 104. A connecting-rod 105 is pivoted at its upper end to said crank 104, and at its lower end it is pivoted to an arm 106 on shaft 107, mounted in bracket 108, the arm 50, with which the spring-pins 47 engage, being mounted on the other end of said shaft. In Figs. 14 and 15 the spring-pin is represented as having already passed under the arm 50. In passing under said arm it tips it up and, acting through the intermediate mechanism above described, throws back the lever 102 from under the stop 101, and a spring 221 throws the lever to make the contact.

Rod 109 is pivoted at its lower end to a boss or arm 110 of the movable knife-blade lever 95 and at its upper end carries a loop 111, through which passes the main shaft 12. Carried on the said main shaft 12 at one side of the loop 111 is a pointed cam 112. Projecting from the upper end of the said loop is a roll 113, which extends over the path of the cam 112. When the contact-lever 95 is down and the contact closed with the blade in its socket, the rod 109 will be in its lowest position, with the roll 113 resting in the notch between the points on the cam 112, but as soon as the main shaft 12 in its rapid revolution brings one of the points of the cam in contact with the roll 113 said roll will ride up on the inclined back of the cam-point and lift the rod 109 and tip lever 95, thereby immediately breaking the contact and allowing the lever 102 to come back into position under the stop 101, so that when the cam-roll 113 rides off the cam-point again it cannot drop into the notch between the points until in the operation of the machine the lever 102 shall be withdrawn from under the stop 101. In the meantime as the shaft 12 revolves the cam-points will revolve around under the roll without any effect.

The clutch mechanism and connected devices which control the tripping of the rear contact and the movement of the packages is shown particularly in Figs. 5 to 9. The shell of the clutch 114 rests upon the base 115, which is keyed fast to the shaft 116 by key 233. It may be shrunk on instead of being keyed. The shaft 116 passes through a sleeve 117, which has a bracket projection by which it is secured to the frame. Said shaft is formed with a shoulder 231, which rests upon the eccentric 132, and the eccentric rests on the upper end of the sleeve which supports the shaft. At the lower end of said shaft is a pinion 118, which meshes with the main gear-ring K and gives to said ring its motion. The upper portion of the clutch—that is, the shell 114—is mounted loosely on said shaft 116, so as to rotate on said shaft while the shaft is stationary and the clutch disengaged. This shell 114 is in constant rotation by means of the bevel-gear 119, fixed thereto, which engages with the bevel-gear 120 on the main shaft 12. On the inside wall of the shell 114 there are a number of recesses 121, with which the pawl 122 engages at certain times in the operation. The pawl 122 is fixed on pivot 123, which passes loosely through the base 115, and on the lower end of said pivot 123 is fixed the pawl 124 below the base 115, as shown in Fig. 9. The pivot 123 is free to turn in the hole in the base 115, through which it passes, so that both pawls and pivot will turn together when either turns. A spring 125 tends to pull and keep the pawl 122 in engagement with one of the recesses 121; but said pawl is kept out of engagement while the package is being filled by the lever 130, which engages with pawl 124, and pawl 122 remains so disengaged except when the gear-ring K is to be moved to bring a package to the scales. The disengaged position is shown in Fig. 5$^b$. A push-rod 126, having bent end 127, is free to move endwise and to partially turn on its axis. A boss 129, carried on said rod, engages with a notch in the lever 130, (see Fig. 8,) so that the endwise movement of the rod turns said lever on its pivot. Pivoted to an arm of cross-head 23 is a pawl 131, beveled on its rear side. This pawl being fixed to the cross-head moves back and forth with the cross-head according to the movement of the core of the solenoid. When the gate is open and the cross-head is in its rearmost position, (see Fig. 5$^b$,) the pawl 131 is behind the bent end of rod 126. The pawl 122 is out of engagement with the recess 121 of the shell 114 and the shell rotates idly without rotating shaft 116 or base 115. When the circuit is made through the forward solenoid and the gate closes, the pawl 131 will move forward against the bent end 127 of said rod 126, pushing the rod forward and tipping up lever 130, thereby disengaging it from pawl 124. When the pawl 124 is thus disengaged, spring 125 swings pawls 124 and 122 around into the position shown in Fig. 5$^c$, with the heel $b$ of pawl 122 engaging in one of the recesses 121 of the shell 114 of the clutch and the toe $a$ engaging shaft 116, thus locking the shell and the base together and causing the base 115 and the shaft 116, to which it is fast, to revolve, together with shell 114, which, as already stated, is continuously rotating. They will remain locked and rotating together until the pawl 122 is tripped at the end of a revolution, as will be described hereinafter. Fig. 6 shows it half-way around. The revolution of shaft 116 is communicated through pinion 118 to gear-ring K, which carries the packages. The object of having a number of recesses 121 in the shell is to insure speedy engagement when the proper time arrives. The exact number is immaterial. With only one recess it will be operative, but not with such rapidity. The gear-ring is so proportioned to the spacing between the package-moving fingers that when the clutch has made a complete revolution a package will be brought to the scales.

The mechanism for stopping the gear-ring after a package reaches the scales is as follows: An eccentric 132 on shaft 116 is connected with lever 133 by link 134, said lever 133 being mounted on the square end of rod 126, so that the rocking motion transmitted to lever 133 by the eccentric 132 is communicated to said rod 126. The rod 126 is, however, free to slide in the square hole in the lever 133. The eccentric makes one revolution for each revolution of the clutch. During the first half of the revolution the bent end of the rod 126 is being gradually turned down until the eccentric reaches its extreme position at the end of the half-revolution, as shown in Fig. 6, when the bent end swings out far enough to clear the pawl 131. As soon as it becomes thus disengaged the spring 135 pushes the rod 126 back behind pawl 131. During the remaining part of the revolution the eccentric is returning the rod 126 to its upright position, as in Figs. 7 and 8, which show the clutch at the end of a revolution and the heel b of pawl 122 disengaged from the recess 121. As rod 126 receded under the action of spring 135 at the end of a half-revolution it brought lever 130 down to its normal position, as in Figs. 7 and 8, ready to intercept pawl 124 upon the completion of the revolution of the clutch. The interception of the pawl 124 by lever 130 turns the pawls 122 and 124 on their axes, thus throwing the heel b of pawl 122 out of recess 121 and withdrawing the toe a from the shaft 116 and swinging point c against the shaft, as both pawls are fixed on the same shaft. The shell and base of the clutch are thus disengaged. The movement of base 115, and thereby that of the shaft 116 and the gear-ring K, is immediately stopped by the point c of pawl 122 bearing on the shaft 116. By this time a new package will have reached the scales and the spring-pin 47, which is pushed back by the package, engages with arm 50, tipping it up and actuating the mechanism which makes the forward contact, as already described, thus completing the circuit through the rear solenoid and opening the gate. As the solenoid-core and cross-head 23 recede the pawl 131, which is now in front of the bent end portion 127 of push-rod 126, being on a pivot and with its bevel side against the said end 127, will slide back past the rod, as shown in Fig. 10. After the pawl 131 has passed the rod it will engage with a stud (not shown) or with the end of the slot in the casing H' or some other suitable device, which throws the pawl back to its normal position. The gate now being open and a package on the scales, as soon as the package is filled the scale-beam will drop, the gate-closing contact will be made, the solenoid and slide-rod 126 will move forward, lever 130 will be tripped, and the clutch and package-moving ring will revolve again.

Pivoted to the cross-head 23 is a depending rod 136. In the lower end of said rod there is a pin 137, by which the rod is pivoted to arm 138, said arm being pivoted to the post 139. This pin extends crosswise just above the rear arm of the main scale-beam. When the core of the solenoid slides forward and closes the gate, the rod 136 is brought into its most upright position, depressing the lower end. The pin 137 bears down on the rear arm of the scale-beam, tipping up the forward arm and the package-supporting portion into its normal position and holding it firmly in that position as long as the gate remains closed. When the gate opens again, the locking-pin will be lifted. The object of so locking the scales is to hold them steady while the full package is being removed and the new empty package is being brought to the scales. As the scales are balanced for a certain weight of package, if the scales are not locked when a full package is partially removed the pressure being reduced the scales would tend to fly up and tip the package over. By locking the scales in the way mentioned before the package is removed the package will slide off on a horizontal line, there being no need to depress the rails on the exit side.

When very dry goods are being weighed, and especially during the first rush of goods that follows the opening of the gate, a cloud of fine particles floats out into the air unless some preventive is used. In order to draw away this dust, I employ the following devices: Attached to the bottom of the hopper H is a chamber 141, extending around the front and sides of the hopper, but not extending under the outlet-opening of the hopper. It projects down as near the top of the package as possible without interfering with the operation of the machine. The bottom of the said chamber is covered with a fine wire-gauze 142, and the chamber is otherwise closed except where the exhaust-tubes 143 enter. One exhaust-tube or more may be employed. The exhaust-tubes are connected with a blower 144, which maintains constant suction through the tubes 143 and through the wire-gauze of the chamber 141 to draw off the fine particles of dust.

In order to settle the goods in the package while being filled, I employ a tapper which taps the package while the goods are running in or during such portion of the time as is desired. (See Fig. 17 and following.) Shaft 151, having on its end pulley 152, is belted to the intermittently-rotating part of the clutch 33 on the driving-shaft 12. Pivoted on fixed shaft 153, supported in frame 154, are a series of levers or tappers 155, whose rear ends extend underneath the package on the scales. Fixed on said shaft 151 are a series of cams 156, one for each tapper, which as the said shaft revolves give to the tappers a vertical vibrating motion, causing them to tap the bottom of the package. These cams are preferably arranged so that the vibrations of the tappers break time with each other. As the shaft 151 is belted to the clutch 33, it will rotate only during the time that the goods are being fed; but it is desirable that the tapping should cease a little while before the package is full, otherwise the accuracy of the weight may be disturbed and the contents partly shaken from the package. In order to regulate the duration of the tapping, the following devices are employed: Fixed on the shaft 157 is a ratchet-wheel 158, said shaft also having fixed thereon a series of stop-fingers 181, which at the proper time in the revolution of the shaft 157 engage with the downwardly-projecting arms 173 of the tappers and stop their movement. Mounted on an eccentric 177 on the shaft 151 is the pawl 159, and pivoted on said shaft is pawl 160, both of which pawls engage with the ratchet 158. The pawl 159 is on an eccentric for the purpose of feeding the ratchet, and the other pawl 160 is on the center, so as to prevent the ratchet from slipping when the eccentric-pawl lets go. In the face of the ratchet are a series of holes 161, into one of which is inserted the pin 162, which is adapted to strike the fixed stop-pin 163 when the pawls are tripped in the manner to be described, and the spring 164 turns shaft 157 and ratchet 158 backward. On the rim of the ratchet is a smooth portion 165, which causes the pawl to slip without feeding when in course of its rotation the smooth place reaches the pawl, and the position of this smooth place bears such relation to the position of the stops 181 that the said stops will always lift the tapper from engagement with the cams at the same time that the smooth place 165 reaches the pawls, so that the tappers and the ratchet may both be made inactive at the same time. The pawl is tripped by means of one of the package-moving fingers on the gear-ring after the gear-ring begins to move, so that the tapper may be in readiness for operation as soon as a new package reaches the scale. A rod 166, pivoted at one end to the pawl 159, is pivoted at its other end to one arm of lever 167, which is pivoted in a suitable support. Pivoted to the other arm of said lever 167 is rod 168, which at its upper end is pivoted to the trip-lever 169, said lever 169 being pivoted to a boss 170 on the fixed ring J. When the gear-ring begins to move to carry an empty package to the scales, the package-moving finger 46 engages the upper arm of lever 169 and tips it on its pivot, thereby acting through rod 168, lever 167, and rod 166 to trip the pawls 159 and 160, allowing spring 164 to rotate backward the shaft 157 and ratchet 158 until the pin 162 strikes against stop-pin 163 and brings it to a rest. As soon as the finger 46 has passed the lever 169 the spring 171 pulls the pawls back into engagement with the ratchet 158. A stud 172, projecting from the inner face of eccentric-pawl 159 in front of pawl 160, causes the two pawls to move together. It will be seen that inasmuch as the spring 164 pulls ratchet 158 around until the pins 162 and 163 engage each other the amount of throw depends upon the position of pin 162 in the ratchet, and the farther the throw the longer it will take the pawls to bring the smooth portion 165 around to the pawls and to bring the stop-levers 181 around to engage with the tappers. The pin 162 is therefore set in the proper hole in the ratchet, depending upon the duration of time it is desired that the tappers shall work according as the size of the package and rapidity of feed vary.

In the modified form of tapper shown in Figs. 20, 21, and 22 the tappers are thrown up to tap the packages by means of springs and are pulled back by means of cams instead of being lifted by cams and brought back by gravity, as in the form shown in Figs. 17, 18, and 19. In this case the driving-shaft 151 should be made to rotate in the opposite direction from that of Fig. 17, which may be done by the method of making the belt connections between pulley 138 and the pulley on the main driving-shaft 12. The belt and pulley 138 are shown in Fig. 2. The belt may be straight or crossed according to the direction of rotation desired. The construction of pawls 159 and 160 and ratchet 158 and stop-pins 162 163 is the same in both forms, also the tripping devices except as to the time of tripping, which will be explained hereinafter. The tappers 174 are likewise pivoted on shaft 153. The tapping-levers have arms 175, with which springs 176 are connected, the springs tending to pull down the arms 175 and throw up the tappers against the package. On the under side of the said arms are projections 178, with which cams 179, carried on the shaft 151, engage. These cams hold the tappers down until the point of the cam rides past the said projection 178, when the spring 176 becomes effective to throw up the tappers. Since the tappers in this modified form become active as soon as the pawls are tripped, and as it is not desirable to have the tappers active until a package reaches the scales, it is preferable to so locate the trip-lever 169 that the package-moving finger will not trip it until just before the package reaches the scales, whereas in the form shown in Fig. 17 the tappers being lifted by the cams would not become active until the cams 156 on shaft 151 begin to rotate. In order, therefore, to prevent the tappers in the modified form from being raised by the springs too quickly and impeding the passage of the moving package-carrier, the trip-lever 169 is placed in such a position upon the ring as to engage with the package-moving finger as near to the end of the movement of the ring as possible.

In operation assume that the gate is closed and package-carrier in place on the rails and an empty package or can placed in that carrier which next in turn will reach the scales, the package pushing back the spring-seated pin 47 and both contacts F and M being open. The package-moving ring K is set in rotation by pushing the rod 126 (see Fig. 8) so as to disengage the stop-lever 130 and allow the clutch 114 115 to become effective. The clutch makes one complete rotation and is then disengaged, as already described, the package-carrier by that time having reached its central position on the scale-section of the track. Just before the carrier reaches the middle of the scale-section of the track the spring-seated pin 47 trips the arm 50, thereby tripping the contact-lever 95 of the forward contact—that is, the gate-opening contact M. This makes the circuit through the gate-opening solenoid G'. The cores of the solenoids and the cross-head 23 move to the rear, thus opening the gate. The clutch 33 brings the comb 15 into operation and the goods are fed into the package. Instantly after the contact is made and the gate is opened the cam 112 in its rapid rotation with the shaft 12 will engage with roll 113 and lift rod 109, tripping up contact-lever 95 and breaking the contact, and both contacts are now open again. In the meantime also as the carrier approached the scales the finger 46 tripped the arm 169, which controls the tapper, and released the pawls 159 and 160 from the ratchet 162, allowing the spring 164 to rotate shaft 157 backward until the stop-pin 162 on the ratchet 158 strikes the fixed stop-pin 163. The tappers 155 are set in operation by the cams 156 on the rotating shaft 151. At each revolution of the shaft 151 the ratchet is fed forward one notch and the tappers will continue in operation until the pawls reach the smooth place 165. By that time also the stop-fingers 181 will have engaged the backs of the downwardly-projecting arms 173 of the tapping-levers and will lift up the tapping-arms out of engagement with the cams 156, so that the tapping will cease, and although the shaft 151 continues to revolve the tappers and the ratchet are held at rest until the pawls 159 and 160 are tripped by another movement of the package-moving ring. When the package contains the required weight of goods, the scale-beam tips, tripping the contact-lever 62 of the rear or gate-closing contact F and making the circuit, so that the gate closes. As the cross-head 23 shoots forward the connecting-rod 136 of the scale-locking device is brought into its more upright position, forcing down the rear arm of the scale-beam and raising again the forward arm to its normal position and holding the scale-beam thus locked until released by the reverse movement of the solenoid in opening the gate. The comb-shaft is also at rest while the gate is closed by reason of the disengagement of the clutch 33. Also as the cross-head 23 moves forward in closing the gate, as just described, the pawl 131 engages push-rod 126 and pushes it forward again, causing the clutch 114 115 to again become effective to set the package-moving ring K in motion. When the gate-closing contact-lever 62 was tripped to make the contact by the tipping of the scales, the lever 82 was tipped, so that the roll 83 was lifted up into the path of the pins 46. When now the package-moving ring K begins to move, as just above stated, one of the pins 46 will engage with the roll 83, thereby depressing it and lifting the contact-lever 62, so that both circuits are again open. The gate-opening contact is again made and the package-moving ring brought to a rest with a package on the scales, and the operation is continued as before.

What I claim is—

1. In an electric circuit, a double contact mechanism, the main contact mechanism comprising a fixed receiving contact-piece and a movable contact-maker, the latter being mounted on a pivoted lever, the supplemental contact mechanism comprising a fixed receiving contact-piece and a movable contact-maker, said movable contact-maker being mounted on a spring which holds it in contact with its fixed contact-piece while the main contact mechanism remains closed, and until after it is broken, the parts being so adjusted that when the said lever is lifted it will break the main contact and will engage the spring and lift the supplemental contact after the main contact is broken, substantially as described.

2. In an electric circuit, a double contact mechanism each comprising two fixed terminals and a movable contact-piece, a pivoted lever on which the main movable contact-maker is mounted and insulated therefrom, a spring fast at one end and having a free end on which the insulated supplemental contact-maker is mounted, said spring holding the supplemental contact closed while the main contact remains closed, and mechanism which tips the lever and first breaks the main contact, the lever then engaging with said spring and breaking the supplemental contact, substantially as described.

3. In an electric circuit, a double contact mechanism, the main contact mechanism comprising two fixed terminals, a pivoted lever and an insulated contact-piece mounted on said lever, the supplemental contact mechanism comprising two carbon terminals, a flexible spring-arm having one end fast to a support and having the other end free, a carbon contact-piece mounted on the free end of said spring, said spring normally holding the said supplemental contact-piece in contact with the supplemental terminals while the main contact is closed, and mechanism which tips the lever and first breaks the main contact, the lever then engaging with said spring-arm and breaking the supplemental contact, substantially as described.

4. In an electric weighing and package-filling machine, a gate-closing circuit, a contact mechanism in said circuit mounted on a pivoted lever which is actuated by the tipping of the scale-beam to close said circuit, a rotating package-moving ring with fingers projecting therefrom, a lifting-lever pivoted to a fixed support below said rotating ring and connected with said contact-lever, one arm of said lifting-lever projecting into the path of said fingers which engage with said lifting-lever to tip the contact-lever and break the contact, substantially as described.

5. In an electric weighing and package-filling machine, a gate-opening circuit, a contact mechanism in said circuit in which the contact-piece is mounted on a pivoted lever, a stop carried on said lever which is engaged by a pivoted stop-lever to keep the contact lifted, a rotating package-carrying ring, package-carriers carried by said ring, each package-carrier having a spring-pin which is pushed back by the package when placed on the carrier, a pivoted trip-arm connected by a connecting-rod with the stop-lever of the contact mechanism and projecting across the path of said spring-pin in such manner that when a package reaches the desired place on the scales the spring-pin will tip said trip-arm and withdraw the stop-lever from the contact-lever allowing the gate-opening circuit to be closed, substantially as described.

6. In an electric weighing-machine in which the flow of goods is controlled by a gate electrically operated, a contact mechanism forming a part of the circuit, in which the contact-piece is mounted on a pivoted lever, a rotating shaft, a cam on said shaft, a rod pivoted at one end to the contact-lever and having at its other end a projection which at intervals engages with said cam, said rod being pulled down when the contact-lever is tripped and the contact is made, thereby bringing the projection on said rod into position where the cam engages with said projection and lifts the rod and tips the contact-lever thereby opening the circuit, substantially as described.

7. In a weighing and package-filling machine, a package-carrier, means for supporting the carrier on a track, and a spring-seated push-pin mounted in a guide-slot in the rear part of the carrier, said pin being pushed back and the spring compressed when a package is introduced, substantially as described.

8. In a weighing and package-filling machine, an intermittently-rotating package-moving ring with a series of fingers projecting therefrom, stationary ring-rails and movable package-carriers supported on said rails, the carriers being engaged by said fingers and moved around on said rails, substantially as described.

9. In a weighing and package-filling machine, in combination with the scales, a scale-locking device, mechanism which controls the feed of goods to the scales and shuts off the flow when the scale-beam tips and which simultaneously therewith actuates the locking device and locks the scale-beam, said feed-controlling mechanism unlocking the scales when it opens the feed, substantially as described.

10. In a weighing and package-filling machine in which the flow of goods is controlled by a gate, in combination with the scales, a locking device which is actuated by the mechanism which actuates the gate so that when the scale-beam tips and the gate closes, the scale-beam will then become locked, and when the gate opens the scale-beam will become unlocked, substantially as described.

11. In a weighing and package-filling machine in which the flow of goods is controlled by a gate which is opened and closed by a reciprocating portion, in combination with the scales, a rod pivoted at one end to said reciprocating portion and connected at its other end with mechanism which when the reciprocating portion moves in a direction to close the gate engages with the scale-beam to prevent tipping again after goods are weighed and which is released from engagement when the gate is opened by reciprocation in the reverse direction, substantially as described.

12. In a weighing and package-filling machine in combination with a hopper, a slide-gate which controls the flow of goods from the hopper, a rotatable shaft having a pinion which gears with a rack on said gate, and a reciprocating rod having a rack with which also a pinion on said shaft engages, substantially as described.

13. In a weighing and package-filling machine, the combination of a rotatable ring which moves the packages, a rotatable shaft having a pinion which gears with said package-moving ring, a clutch mounted upon said shaft one portion of which is fast to said shaft and the other portion is loose thereon, the loose portion being connected to a driving-shaft, mechanism which when the flow of goods to the package is cut off locks the two portions of the clutch together thereby giving motion to the package-moving ring for a certain interval of rotation when the clutch becomes unlocked and the clutch-shaft and package-moving ring are stopped, substantially as described.

14. In a weighing and package-filling machine, the combination of a rotatable ring which moves the packages, a rotatable shaft having a pinion which gears with the package-moving ring, a clutch mounted upon said shaft one portion of which is fast to said shaft and the other portion is loose thereon, the loose portion being connected to a driving-shaft, an intermittently-reciprocating portion which opens and closes a gate which controls the flow of goods to the package, a push-rod actuated by the gate-closing movement of said reciprocating portion, and mechanism for locking the two portions of the clutch together which becomes operative to so lock them when the gate closes; the package-moving ring being rotated thereby through a certain interval of space, when the clutch becomes unlocked and the clutch-shaft and package-moving ring are stopped, substantially as described.

15. The combination of a rotatable shaft, a clutch mounted upon said shaft one portion of which is fast to the shaft and the other portion is loose thereon, the loose portion being connected to a driving-shaft, a pawl which at certain periods locks the two portions of the clutch together, a stop-lever which holds said locking-pawl out of engagement with the clutch, a push-rod connected with said lever, an intermittently-reciprocating portion which pushes said rod when it slides in one direction, thereby lifting the stop-lever so that the locking-pawl locks the two portions of the clutch and the clutch and shaft make a revolution, means for retracting the push-rod after the clutch is locked and bringing the stop-lever into position to engage the locking-pawl and disengage the clutch upon the completion of a revolution, and means for then stopping the rotation of the clutch-shaft, substantially as described.

16. The combination of a rotatable shaft, a clutch mounted upon said shaft, one portion of which is fast to the shaft and the other portion is loose thereon, the loose portion being connected to the driving-shaft, a pawl which at certain periods locks the two portions of the clutch together, a stop-lever which holds said locking-pawl out of engagement with the clutch, a push-rod connected with said lever, an intermittently-reciprocating portion carrying a pawl which engages said rod and pushes it in one direction to disengage said stop-lever from the locking-pawl, means for then causing the locking-pawl to lock the two portions of the clutch together so that the clutch and its shaft revolve together, an eccentric on said shaft which turns said push-rod on its axis to bring its pawl-engaging arm out of engagement with said pawl, a spring which then retracts the push-rod and brings the stop-lever back into position to engage the locking-pawl of the clutch at the end of its revolution and thereby disengaging the clutch, and means for then stopping the rotation of the clutch-shaft, the push-rod being turned by said eccentric in a reverse direction on its axis into its first-described position and its engaging pawl being brought behind it on the return movement of the reciprocating portion, substantially as described.

17. In combination with a shaft, a clutch comprising a disk-base fixed on said shaft, a shell loose on said shaft and having recesses in the inner periphery thereof, a pawl which locks the two portions of the clutch together at certain periods, a stop-lever which holds the locking-pawl out of engagement with the clutch at certain other periods, means for tripping the stop-lever at certain intervals and a spring which then brings the locking-pawl into engagement with the clutch, substantially as described.

18. In a weighing and package-filling machine a tapper for tapping the packages while being filled and means for actuating the tapper, stop mechanism which automatically causes the tapper to cease after a predetermined period of tapping, means for automatically releasing the stop mechanism at a predetermined time in the operation of the weighing-machine and permitting the tapper to again become active, and means for adjusting the stop mechanism so that the predetermined period of tapping may be varied, substantially as described.

19. In a package-filling machine, a series of pivoted tappers, a driving-shaft and a series of cams on said driving-shaft which when the driving-shaft rotates actuates said tappers so as to break time with one another, substantially as described.

20. In a tapper for a weighing and package-filling machine, a tapping-lever and means for actuating the same, a rotatable shaft on which is fixed a stop adapted to engage with said tapping-lever, a ratchet-wheel fixed on said shaft, a driving-shaft, a feed-pawl engaging with said ratchet and actuated by said driving-shaft, a dead place on said ratchet-wheel where the pawl becomes ineffective, means for tripping the pawl before the time for a new operation, means for returning the rotatable stop-shaft to its starting-point, and an adjustable stop whereby the arc of rotation of the rotatable stop may be varied, thereby regulating the duration of the tapping, substantially as described.

21. In a weighing and package-filling machine, a vertically-adjustable hopper, a rotatable shaft mounted in said hopper and having a mixer attached thereto, a driving-shaft, pinions on said shafts and intermediate gearing supported on links so that the two shafts will be in gear with each other in the various adjusted positions of the hopper, substantially as described.

In testimony whereof I affix my signature, in the presence of two witnesses, this 21st day of June, 1897.

GEORGE W. WATSON.

Witnesses:
WM. H. DOBLE,
WILLIAM A. COPELAND.